(12) United States Patent
Litchfield et al.

(10) Patent No.: US 7,315,781 B2
(45) Date of Patent: Jan. 1, 2008

(54) SYSTEM AND METHOD FOR DETERMINING ORIENTATION BASED ON SOLAR POSITIONING

(75) Inventors: Mark H. Litchfield, Dracut, MA (US); David Delude, Andover, MA (US); Joseph McCormack, Windham, ME (US)

(73) Assignee: Textron Systems Corporation, Wilmington, MA (US)

( * ) Notice: Subject to any disclaimer, the term of this patent is extended or adjusted under 35 U.S.C. 154(b) by 0 days.

(21) Appl. No.: 11/471,325

(22) Filed: Jun. 20, 2006

(65) Prior Publication Data

US 2007/0145252 A1    Jun. 28, 2007

Related U.S. Application Data

(62) Division of application No. 10/642,720, filed on Aug. 18, 2003, now Pat. No. 7,079,944.

(51) Int. Cl.
    *G01C 21/26* (2006.01)
(52) U.S. Cl. ........................ 701/207; 701/222
(58) Field of Classification Search .............. 701/1, 701/3, 4, 13, 222, 200–217; 244/158 R, 244/164
    See application file for complete search history.

(56) References Cited

U.S. PATENT DOCUMENTS

| | | | |
|---|---|---|---|
| 5,266,958 A | 11/1993 | Durboraw, III | 342/357 |
| 5,446,465 A | 8/1995 | Diefes et al. | 342/357 |
| 5,717,404 A | 2/1998 | Malla | 342/357 |
| 5,745,869 A | 4/1998 | van Bezooijen | 701/222 |
| 5,959,576 A | 9/1999 | Ring | 342/357.11 |
| 6,018,315 A | 1/2000 | Ince et al. | 342/357.11 |
| 6,142,423 A | 11/2000 | Wehner | 244/164 |
| 6,158,694 A | 12/2000 | Gowrinathan | 244/171 |
| 6,216,983 B1 | 4/2001 | Wehner | 244/158 |
| 6,223,105 B1 | 4/2001 | Teague | 701/13 |
| 6,253,125 B1 | 6/2001 | Barker | 701/13 |
| 6,285,315 B1 | 9/2001 | Pratt | 342/357.09 |
| 6,289,268 B1 | 9/2001 | Didinsky et al. | 701/13 |
| 6,398,155 B1 | 6/2002 | Hepner et al. | 244/3.15 |
| 6,501,419 B2 | 12/2002 | Davis et al. | 342/352 |
| 6,512,979 B1 | 1/2003 | Needelman et al. | 701/222 |
| 6,523,786 B2 | 2/2003 | Yoshikawa et al. | 244/171 |
| 6,577,929 B2 | 6/2003 | Johnson et al. | 701/4 |
| 6,863,244 B2 | 3/2005 | Fowell et al. | 244/171 |

OTHER PUBLICATIONS

Caruso, M., "Applications of Magnetic Sensors for Low Cost Compass Systems," http://www.ssec.honeywell.com/magnetic/datasheets/lowcost.pdf.

(Continued)

*Primary Examiner*—Richard M. Camby
(74) *Attorney, Agent, or Firm*—Mills & Onello LLP

(57) ABSTRACT

Determination of the orientation of a unit is based on solar positioning. An actual measurement of the position of the sun is taken and compared to a theoretical determination of the position of the sun. By comparing the actual and theoretical positions, the orientation of the unit is determined in an accurate, reliable, and economical manner.

41 Claims, 9 Drawing Sheets

OTHER PUBLICATIONS

Trebi-Ollennu, A., et al., "Design and Analysis of a Sun Sensor for Planetary Rover Absolute Heading Detection," IEEE Transactions on Robotics and Automation, vol. 17, No. 6, pp. 939-947, Dec. 2001.

Anonymous Author, "EPS Tenerife: In Spira's Solar Tracking," Nov. 11, 2002, http://www.inspira.es/newsroom/981139.html.

Cornwall, C., "General Solar Position Calculations" Mar. 21, 2003, http://www.srrb.noaa.gov/highlights/sunrise/solpos/solareqns.pdf.

Deans, Matthew, "Antarctic Meteorite Search: Sun Tracking Experiment." Carnegie Mellon University/NASA 1997, http://www-2.cs.cmu.edu/~meteorite/Antarctica97/SunTracking/.

Usher, Kane et al., "A Camera as a Polarized Light Compass: Preliminary Experiments"; Proc. 2001 Australian Conference on Robotics and Automation, Sydney, Nov. 14-15, 2001, http://www.araa.asn.au/acra/acra2001/Papers/Usher.pdf.

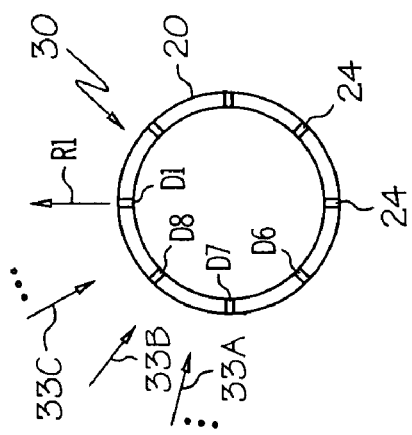
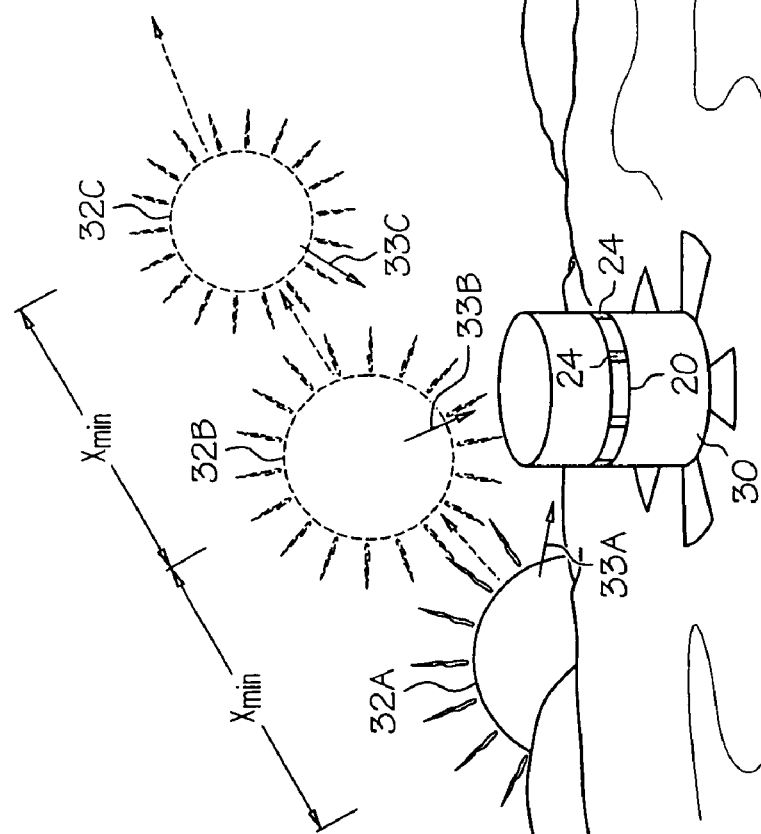
FIG. 4
FIG. 3

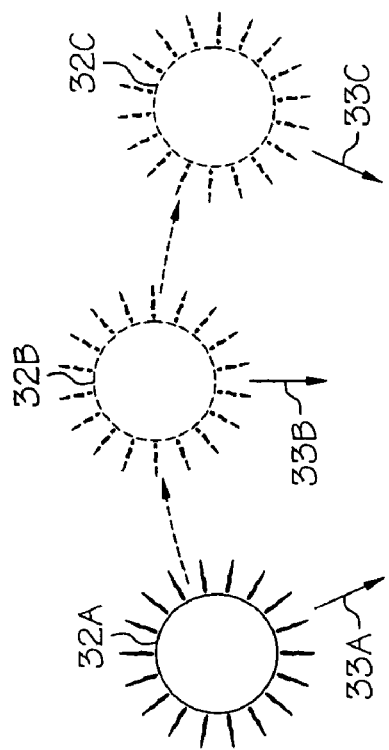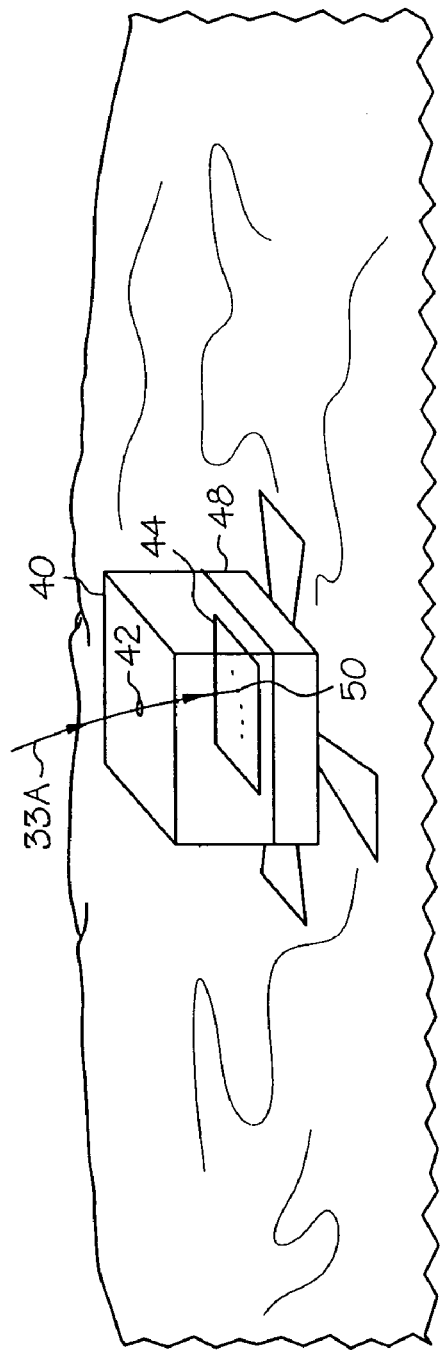
FIG. 7

SYSTEM AND METHOD FOR DETERMINING ORIENTATION BASED ON SOLAR POSITIONING

RELATED APPLICATIONS

This application is a divisional of U.S. patent application Ser. No. 10/642,720, filed on Aug. 18, 2003 now U.S. Pat. No. 7,079,944, the contents of which are herein incorporated by reference in their entirety.

BACKGROUND OF THE INVENTION

In certain applications, it is advantageous for a field-deployed unit to have knowledge of its orientation. For example, a unit may require knowledge of its own orientation relative to a target, or an array of units may require knowledge of their respective orientations relative to each other and/or relative to a target. In a data share process, for example, multiple units communicate with each other in order to effectively track a target of interest, or in order to determine which unit can most effectively engage a target. Efficient processing requires orientation estimates by each unit involved in the tracking process. In another function, referred to as control station communication, each individual unit communicates with a central computer to provide an operator of the central computer with updated tracking information so that the operator can plan an effective solution. Again, in this case, orientation information for each unit involved is critical for accurate engagement.

While the popular global positioning system (GPS) provides an accurate accounting of latitude, longitude, and altitude of a unit, as well as an accurate time reference, the orientation of a unit cannot be derived solely from the received GPS data. Accordingly, magnetic and electronic compasses remain as popular mechanisms for providing orientation information. When properly calibrated, such compasses commonly achieve orientation readings to within a tolerance of ±2°.

A magnetic compass detects the horizontal direction of the earth's magnetic field. Using this reference, a unit can derive its orientation. However, the accuracy of a magnetic compass is limited by environmental issues, such as hard and soft iron effects in the surrounding landscape, and variations in the earth's magnetic field. In addition, the magnetic fields generated by nearby system electronics can further interfere with accurate readings. Furthermore, a magnetic compass requires periodic calibration, which can be an expensive operation when the unit is in long-term storage or when the unit is deployed in the field.

The electronic compass compensates for the hard and soft iron effects by using specific calibration algorithms. Soft iron effect calibration is quite complicated and requires an initial calibration procedure when a unit is deployed in the field. The initial calibration can be easily disturbed if the unit is moved, and a complete system recalibration is required every few months. Such recalibration is often times impractical or impossible for field-deployed units. Furthermore, electronic compasses are sensitive to temperature, especially outside the range of −40 C to 80 C.

SUMMARY OF THE INVENTION

The present invention is directed to a system and method for determining the orientation of an object based on its positioning relative to a source of electromagnetic energy, for example, the sun. In this manner, the present invention provides an accurate, reliable, and economical approach for determining object orientation, without being subject to the limitations associated with the conventional electronic and magnetic compasses.

In one aspect, the present invention is directed to a system for determining the orientation of an object relative to a source of electromagnetic radiation. The system includes a plurality of sensors, each of the sensors producing a corresponding output signal when placed in the path of electromagnetic radiation emitted by a source. A controller receives the output signals of the sensors, and for determining the orientation of the object relative to the source based on the sensor output signals.

The source of the electromagnetic radiation may comprise, for example, a heavenly body, for example, the sun. The electromagnetic radiation is for example, of a type selected from the group consisting of visible radiation, infrared radiation, and ultraviolet radiation.

In one example, the sensors are optical sensors, for example photodiodes. The output signals are derived from the intensity of light radiation received at the photodiodes. Each of the sensors has a corresponding viewing angle having a center line, and the center lines are at known orientations relative to each other. The center lines may, for example, lie on a plane and/or may intersect at a common point.

In another example, the controller samples multiple sets of the sensor output signals at periodic time intervals. In this case, the controller's determination of the orientation of the object is based on multiple sets of the sensor output signals. The controller further determines a subset of the output signals of the sensors, for example at least three sensor output signals, having signal levels that are greater than those of the other output signals, and fits a polynomial to the output signals of the subset. The controller then determines one of a maximum and minimum of the polynomial, and determines the orientation of the object based on the one of the maximum and minimum.

The controller optionally determines the orientation of the object further based on a known factor of the type consisting of: time, latitude, longitude, and altitude.

The controller determines the orientation of the object further based on a theoretical determination of the electromagnetic radiation source position. The controller further determines the orientation of the object by comparing the theoretical determination of the electromagnetic radiation source position to an actual determination of the position based on the sensor output signals.

In another aspect, the present invention is directed to a system for determining the orientation of an object relative to a source of electromagnetic radiation. The system includes a two-dimensional array of sensors, each of the sensors in the array producing a corresponding output signal when placed in the path of electromagnetic radiation emitted by a source. A lens directs the electromagnetic radiation from the source onto the two-dimensional array. A controller receives the output signals of the sensors, and determines the orientation of the object relative to the source based on the sensor output signals.

The two-dimensional array of sensors comprises, for example, a charge-coupled device (CCD) array, or a bolometer array.

The output signals of the sensors may comprise binary signals that indicate those sensor elements of the two-dimensional sensor array that are activated in response to receiving the electromagnetic energy at a level above a predetermined threshold. The controller determines the orientation of the object based on multiple samples of the sensor output signals taken at predetermined time intervals. The controller further tracks elements of the sensor array that are activated at each sample interval, and fits a polynomial to the activated sensor elements over time. The orientation of the object is then determined based on the polynomial.

The lens may comprise, for example, a pinhole in a housing body containing the two-dimensional array of sensors.

In another aspect, the present invention is directed to a method for determining the orientation of an object relative to a source of electromagnetic radiation. Electromagnetic radiation emitted by a source is received at a plurality of sensors. Each of the sensors produces a corresponding output signal in response to the received electromagnetic radiation. An actual position of the source of electromagnetic energy is determined based on the sensor output signals. A theoretical position of the source of electromagnetic energy is computed and compared with the actual position to determine the orientation of the object.

By comparing the actual and theoretical positions, the orientation of the unit is determined in an accurate, reliable, and economical manner.

BRIEF DESCRIPTION OF THE DRAWINGS

The foregoing and other objects, features and advantages of the invention will be apparent from the more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 3 is a conceptual view of the embodiment of FIG. 1 deployed in a field environment, in accordance with the present invention.

FIG. 4 is top view of the deployed embodiment of FIG. 3, in accordance with the present invention.

FIG. 7 is a conceptual illustration of the embodiment of FIG. 6 deployed in a field environment, in accordance with the present invention.

DETAILED DESCRIPTION OF PREFERRED EMBODIMENTS

Figure 1:
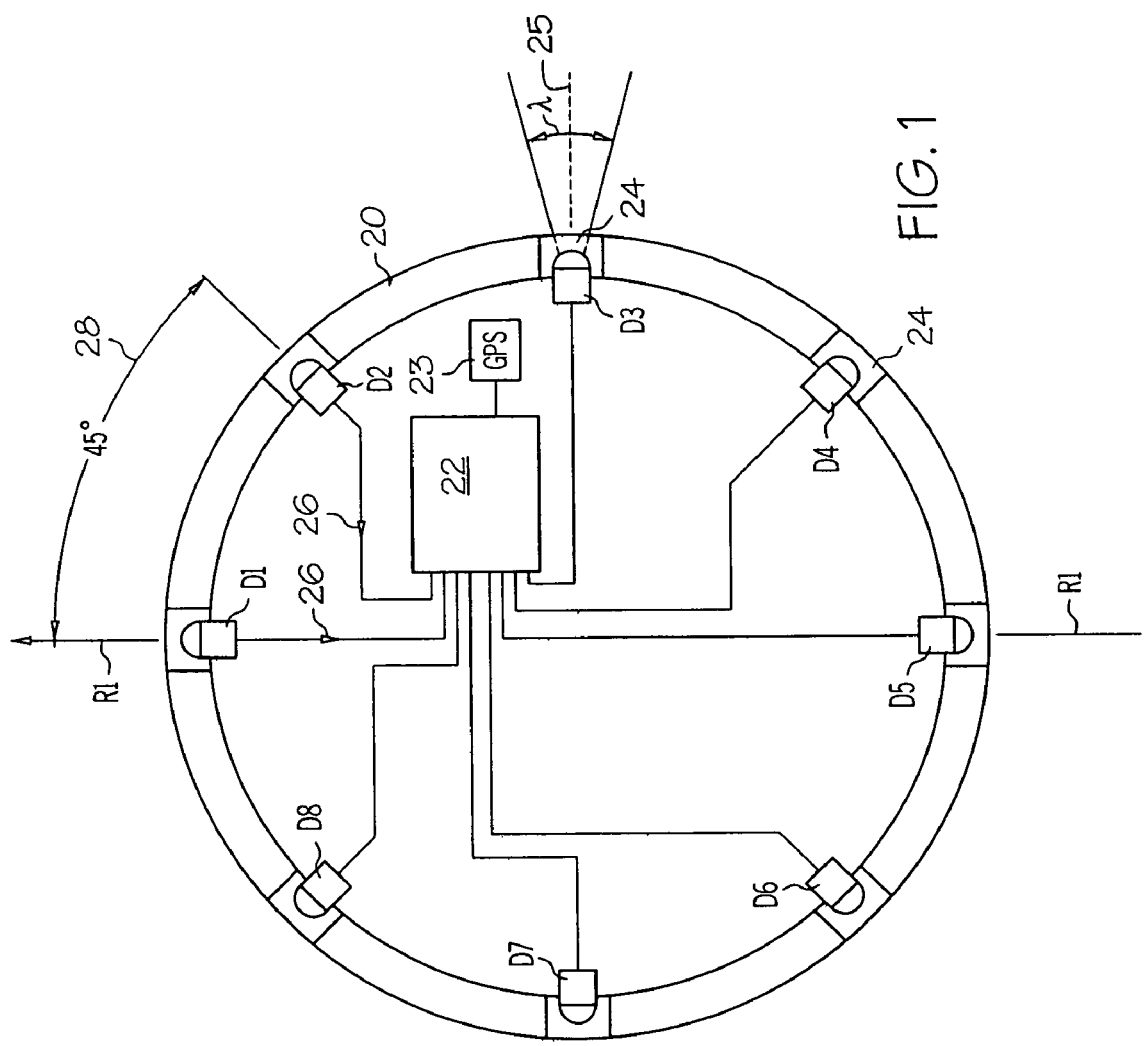
FIG. 1 is a top view of a first embodiment of an apparatus for determining the orientation of an object, in accordance with the present invention.

The system and method of the present invention provide for the ability to determine the orientation of an object based on solar positioning. In one embodiment, a plurality of sensors are housed in a unit that is stationary for an extended period of time. The sensors sample electromagnetic energy, for example visible, infrared, or ultraviolet radiation, received from the sun, or other heavenly body or energy source, at predetermined time intervals. The time intervals are preferably long enough such that the earth's rotation relative to the sun is discernable, and in this manner, the sensor readings at the predetermined time intervals track the motion of the sun in the sky relative to the unit. For example, the time intervals may comprise 10-30 minute intervals. In this manner, assuming the latitude and longitude of the unit are accurately known, as well as the time, then the orientation of the unit can be accurately determined.

The energy emitted by the sun is intensive enough such that it can be readily detected without the need for distinguishing it from other light sources. In addition, the sun has a relatively small angular radius, so that it can be modeled as a point source, which simplifies related calculations. The position of the sun with respect to the earth at any time can be predicted using a three-dimensional polar axis with the coordinates of position, altitude angle, and azimuth angle. The position is measured in degrees latitude and degrees longitude; data that can be accurately and economically obtained from a GPS receiver. The solar altitude angle ($\alpha$) is defined as the angle between the sun and the horizontal plane of sight. The solar azimuth angle (Y) is defined as the projection of the sun onto the horizontal plane of sight. A table of definitions and parameters, as well as formulae, related to the calculation of the sun's position relative to a location on earth are given below, as cited in Nuwayhid, R. Y., Mrad, F., and Abu-Said, R., "The Realization of a Simple Solar Tracking Concentrator for University Research Applications," *Renewable Energy*, vol. 24, no. 2, pp. 207-222, Oct. 2001:

L Latitude of the location—the angle between a line from earth's center to the location and its projection on the equator plane.

Lloc Longitude of the location.

$\alpha$ Solar altitude—the angle between the sunray and the horizontal plane of sight.

n Day of the year.

$\delta$ declination—angular position of the sun at solar noon with respect to the plane of the equator.

$\omega$ Hour angle—the angular displacement of the sun east to west of the local meridian due to the rotation of the earth.

Ys Solar azimuth—the deviation of the projection of the sunrays on the horizontal surface and the local meridian.

Zenith The point directly upwards—a perpendicular line to a point in the sky from the horizontal plane at the location $\theta$ Angle of incidence—angle between the projection of the normal to the concentrate plane to the horizontal and local meridian.

$\beta$ Angle between the surface and the horizontal.

The first step in calculating the solar altitude and azimuth angles is to determine the solar time, which describes the time of the sun with respect to the local time.

$$\text{Solar Time} = \text{standard time} + (\text{Lst} - \text{Lloc})/15 + E \quad (1)$$

where $$E = 9.87 \sin 2B - 7.53 \cos B - 1.5 \sin B \quad (2)$$

and $$B = 360(n - 81)/364 \quad (3)$$

The general relationship of the angles defined above is as follows:

$$\cos \theta = \sin \delta \sin L \cos \beta - \sin \delta \cos L \sin \beta \cos Y + \cos \delta \cos L \cos \beta \cos \omega + \cos \delta \sin L \sin \beta \cos Y \cos \omega + \cos \delta \sin \beta \sin Y \sin \omega \quad (4)$$

The incident angle θ can be determined according to the following relationship:

$$\cos \theta = \cos \alpha \cos \beta - \sin \alpha \sin \beta \cos(Y_s - Y) \quad (5)$$

where $$\delta = \sin(360(284 + n)/365)) \quad (6)$$

Finally, the exact solar altitude and azimuth angles can be calculated to obtain the trajectory of the sun according to the following relationship:

$$\sin \alpha = \sin L \sin \delta + \cos L \cos \omega \cos \theta$$

and $$\sin Y = \cos \delta \sin \omega / \cos \alpha \quad (7)$$

The above equations demonstrate that it is always possible to determine the trajectory of the sun in terms of its altitude and azimuth angles α, Y. Derivation of these values require knowledge of the standard time as well as the latitude and longitude position of the unit. An on-board GPS system is suitable for retrieving this data, which can be provided to a controller that processes the above formulae using an algorithm to determine the position of the sun.

In a first embodiment, as shown in FIG. 1, a plurality of sensors, for example optical sensors in the form of photodiodes D1 . . . D8, are mounted in a housing 20 at a known angle 28 relative to each other, for example, 45°. The diodes themselves preferably have a fairly narrow viewing angle λ, for example on the order of 5-10°, and are preferably recessed into slots 24 formed in the housing body 20 to further limit the viewing angle λ. In this manner, the photodiodes D1 . . . D8 tend to receive only that electromagnetic energy which is oriented within the respective viewing angles. A reference point, or axis R1, can be selected as a frame of reference for the unit. For example reference axis R1 can be selected as a radial axis that intersects the center of the unit and the first diode D1. Rotation angle, or orientation, is thus determined relative to this reference axis R1.

Other suitable sensors include, but are not limited to, phototransistors, avalanche photodiodes, microchannel plates, and photoresistors. P-i-n and Schottky-barrier photodiodes may also be used.

The viewing angles λ of the diodes D1 . . . D8 each have a center line 25, and in a preferred embodiment, the center lines 25 of the diode viewing angles λ lie on a plane and intersect at a common point. In an alternative embodiment, the diodes D1 . . . D8 may be slightly tilted in the housing 20 in an upward direction, so as to increase exposure to the sun when the sun is at a higher elevation.

The diodes D1 . . . D8 each generate an independent output signal 26, for example, in the form of a voltage or a current that is provided to a controller 22. The controller 22 samples the output signals 26 at regular intervals, for example at 15 minute intervals. However, under certain circumstances, a single reading may be sufficient for determining the orientation. In one embodiment, the controller 22 determines the output signals that indicate the three highest intensity measurements of the sampled diodes D1 . . . D8. The controller 22 fits a polynomial to the three intensity measurements at each sample interval and determines the maximum of the polynomial. The maximum provides the position of the sun relative to the unit in terms of the sun's azimuth.

The polynomial curve fitting process determines where the peak solar intensity is located relative to the known diode (or photodetectors) locations, and hence determines the position of the sun. A polynomial is derived that closely matches or 'fits' the three highest intensities detected by the photodetectors. The order of the polynomial is arbitrary and may be set prior to receiving any actual intensity levels. For example, a processor implementing the curve fitting may be programmed to fit a fifth-order polynomial, e.g., $ax^5 + bx^4 + cx^3 + dx^2 + ex + f = y$, to the detected intensity values, where y-values are intensities, and the known x-values are three of the detector locations. Once a curve or polynomial is "fit" or calculated, a maximum (extreme) is determined by differentiating the polynomial. The first derivative with respect to x of the polynomial gives the slope of the polynomial and will locate point of zero-slope. A second derivative determines the concavity of any extrema (e.g., maxima or minima), with a positive concavity indicating a local minimum, and a negative concavity indicating a local maximum. The position of the local maximum is the point where the solar intensity is the greatest and where the sun should be located. The x-position of this location may be translated to a polar bearing relative to the center lines of the photodetectors. This bearing is the bearing of the sun relative to the sensors and the unit on which they are mounted. By knowing from astronomical tables which direction the sun is located, by knowing the position on earth (latitude and longitude) where the unit is, and by knowing the time of day, the position indicated by the curve fitting is compared to the known, expected position of the sun. In this manner the orientation of the unit may be determined.

In determining the expected position of the sun, the following formulae, as discussed in Cornwall, C., "General Solar Position Calculations," 2003 Mar. 21, available online at http://www.srrb.noaa.gov/highlights/sunrise/solareqns.PDF; and Blanco-Muriel, M., "Computing the Solar Vector," *Solar Energy*, vol. 70, no. 5, pp. 431-441, 2001, may be implemented in a software program operating on the microcontroller:

$$\text{Fractional Year} = \gamma = 2\pi/365 \ (\text{day\_of\_year} - 1 + (\text{hour} - 12)/24) \quad (8)$$

$$\text{Equation of time} = \text{eqtime} = 229.18(0.000075 + 0.001868 \cos \gamma - 0.032077 \sin \gamma - 0.014615 \cos 2\gamma - 0.040849 \sin 2\gamma) \quad (9)$$

$$\text{Declination angle} = \text{decl} = 0.006918 - 0.399912 \cos \gamma + 0.070257 \sin \gamma - 0.006758 \cos 2\gamma + 0.000907 \sin 2\gamma - 0.002697 \cos 3\gamma + 0.00148 \text{ sub } 3\gamma \quad (10)$$

$$\text{Time offset} = \text{time\_offset} = \text{eqtime} - 4*\text{longitude} + 60*\text{timezone} \quad (11)$$

where longitude is in degrees and timezone represents hours from UTC.

$$\text{True solar time} = tst = hr*60 + mn + sc/60 + \text{time\_offset} \quad (12)$$

where $$hr=0\text{-}23, mn=0\text{-}60, \text{ and } sc=0\text{-}60.$$

$$\text{Hour angle} = ha = (tst/4) - 180 \quad (13)$$

$$\text{Zenith angle} = \phi: \cos\phi = \sin(\text{lat})\sin(\text{decl}) + \cos(\text{lat})\cos(\text{decl})\cos(\text{ha}) \quad (14)$$

$$\text{Azimuth angle} = \theta: \cos(180-\theta) = (\sin(\text{lat})\cos\phi - \sin(\text{decl}))/(\cos(\text{lat})\sin\phi) \quad (15)$$

In this manner, the theoretical location of the sun is determined as a function of known time, latitude and longitude.

The curve fitting process, for determining the actual position of the sun with respect to the unit, may be implemented by least-squares algorithms, i.e., ones that minimize the square of error between actual values and a trial polynomial. Such algorithms, as well as the above formulae for determining the theoretical position of the sun, can be implemented for example as C++, C, MATLAB, and assembly language. Suitable hardware such as digital signal processors (DSPs), application specific integrated circuits (ASICs), and central processing units (CPUs) may be used to run such algorithms and processes.

Upon determination of the actual position of the sun relative to the unit based on the processing of the sensor data, and upon determination of the theoretically expected position of the sun based on the known latitude, longitude, and time data, the actual sun position and the expected sun position are compared to determine the orientation of the unit.

For example, with reference to FIG. 1, if the theoretically expected position of the sun is determined to be at an azimuth of 90° (i.e., due east), and the unit determines that the sun's position is at a certain position between two diodes of the unit (e.g., 2/5ths between diodes D7 and D8, then the orientation of the reference line, for example reference line R1, of the unit is determined to be at 153°.

Assuming a fully calibrated system, a single measurement, that is a single sample, may be sufficient to provide the orientation determination. This is particularly true when the sun is low on the horizon. However, assuming an uncalibrated system, several measurements can be taken periodically over time to provide a series of simultaneous equations that can solve for the unknown in the responsivity or detectivity of the diodes.

Linear algebra techniques may be used to solve for "N" unknown quantities by having "N" linearly independent equations. The unknown quantities here, in an uncalibrated embodiment, may include a certain number of variations of detectivity (responsivity) between nominally identical photodetectors and variations in alignment of the photodetctors (deviations from designed orientation). The hardware and software platforms described above are suitable for solving such simultaneous equations.

Figure 2:
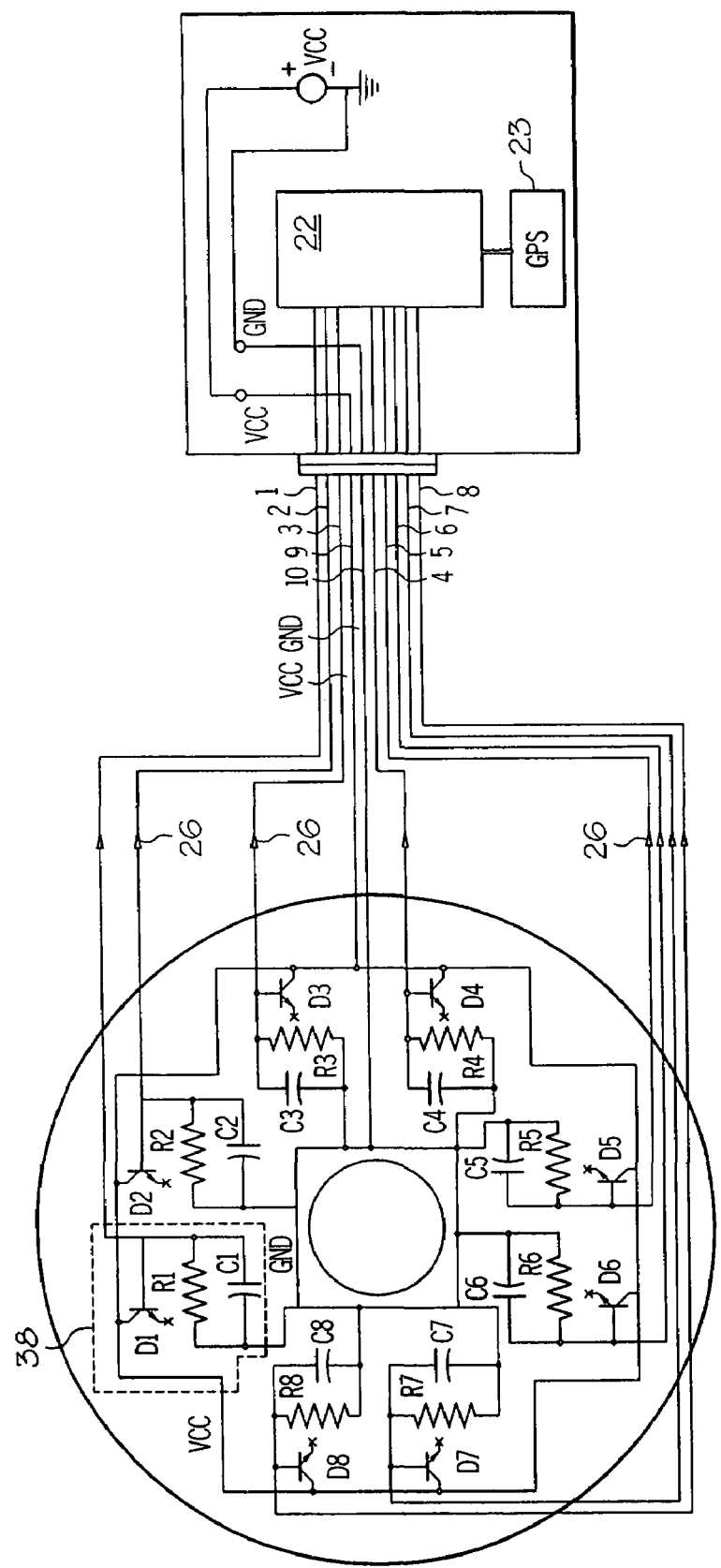
FIG. 2 is a schematic diagram of the embodiment of FIG. 1, in accordance with the present invention.

FIG. 2 is a detailed schematic drawing of the embodiment of FIG. 1. Each diode circuit 38 comprises a photodiode Dn in the form of a phototransistor that operates as a photodiode when configured as shown. The cathode of each photodiode Dn is coupled to a power source, and the anode of each is coupled to a parallel resistor Rn-capacitor Cn combination that is in turn coupled to ground. The photodiodes operate as a current source that is proportional to the amount of light received. Therefore, the light intensity can readily be measured by connecting the photodiode to a resistor Rn in parallel. For example 100 kohm resistors can be used to obtain measurements in the range of 0 to 4 volts. A 0.1 µF capacitor Cn is connected in parallel with each resistor Rn to obtain accurate measurements. Such photodetector devices are typically designed so that a particular n-doped or p-doped material used in the p-n junction of the diode will absorb the incident light. This is done by selecting the active material based on its bandgap energy and by knowing the particular frequency of light at which detection is desired. The part (anode, cathode, n-side, p-side) that is desired to absorb the light has a lower bandgap energy than the other part(s), which will have a higher bandgap energy and which will be transparent to the light of interest.

The anode of each photodiode Dn provides an output signal 26 that is transmitted to controller 22. Controller 22 may take the form of a hard-wired circuit, or preferably a microcomputer or mixed-signal microcontroller, such as the MSP430F149, available from Texas Instruments, Inc., Dallas, Tex., which has a 12-bit analog-to-digital converter and is capable of performing the data sampling, polynomial fit, theoretical sun positioning and other related calculations for determining the orientation of the unit. The controller 22 also receives GPS information, including latitude, longitude, and, if desired, altitude information, as well as time information from the GPS receiver 23.

FIG. 3 is a perspective view of the photodiode-based embodiment of FIG. 1 mounted to a unit 30 that is deployed in the field. The sun 32 is illustrated at first, second, and third positions, 32A, 32B, 32C corresponding three periodic sample times. At the first sample time, the position of the sun 32A relative to the unit 30 is such that the electromagnetic energy beam emitted by the sun 33A is at a first angle relative to the unit 30. Similarly, the energy beams 33B, 33C emitted at the second and third sampling times are at different angles relative to the unit 30, as a result of the earth's rotation between the sample time increments.

As shown at the top view of FIG. 4, the three respective energy beams, 33A, 33B, 33C are incident on the housing 20 at slightly different angles, and therefore the intensity level received by each of the diodes facing that direction, for example diodes D6, D7, D8 and D1, are different for each sample period. For example, diode D7 would have a relatively strong intensity reading from beam 33A and a relatively weak reading from beam 33C. Diode D6 would have a relatively weak intensity reading from beam 33A, and weaker readings from beams 33B and 33C. At each sample time, based on the detected difference in intensity level, a computer or microcontroller, for example controller 22, with accurate knowledge of the time, and latitude and longitude of the deployed unit, accurately computes the orientation of the deployed unit, as described above. Through the use of multiple samples, as shown, variability in environmental exposure, for example due to cloud cover, sensor responsivity, and sensor placement can be resolved by the microcontroller of the unit 30, as the additional samples provide additional data points, for greater accuracy.

Figure 5B:
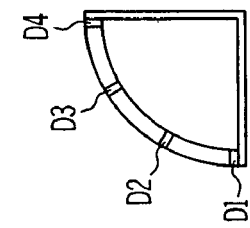
FIGS. 5A, 5B, 5C, and 5D are top conceptual views of various alternative configurations of the embodiment of FIG. 1, in accordance with the present invention.
Figure 5D:
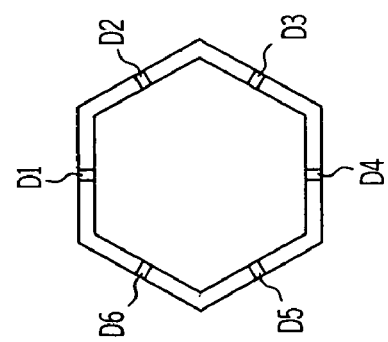
Figure 5A:
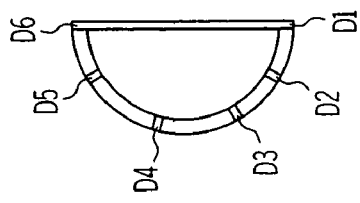
Figure 5C:
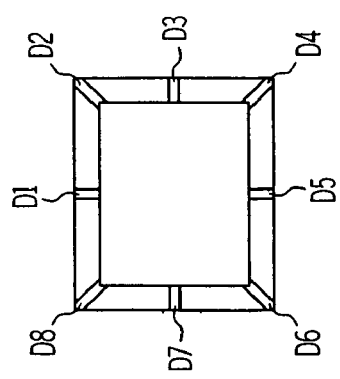

Although the photodiodes D1 . . . D8 of the embodiment of FIG. 1 are arranged generally on a circle, or octagon, having viewing angle center axes that lie at 45° relative to each other, other geometric arrangements apply equally well to the principles of the present invention and are therefore equally applicable. For example, in FIG. 5A, eight diodes D1 . . . D8 are arranged on a square configuration, the viewing angles of the respective diodes D1 . . . D8 being arranged in 45° increments, as in FIG. 1. In FIG. 5B, six diodes D1 . . . D6 are arranged in a semicircle configuration, for example at orientations of 36° relative to each other. In this example, it is preferable that the unit is deployed such that the diodes D1 . . . D6 are positioned to be exposed to either the sunrise, or sunset, assuming the relative location of sunrise or sunset to be known to the individual deploying the unit. In the example of FIG. 5C, six diodes D1 . . . D6 are arranged on a hexagon, for example having viewing angles that are oriented 60° relative to each other. FIG. 5D illustrates four diodes D1 . . . D4 arranged according to a semicircle quadrant, for example having viewing angles of 30° relative to each other. Again, in this example, it is preferred that the unit is deployed to be exposed to either the sunrise or the sunset, since the diode viewing angles are limited to one side of the enclosure.

Figure 6:
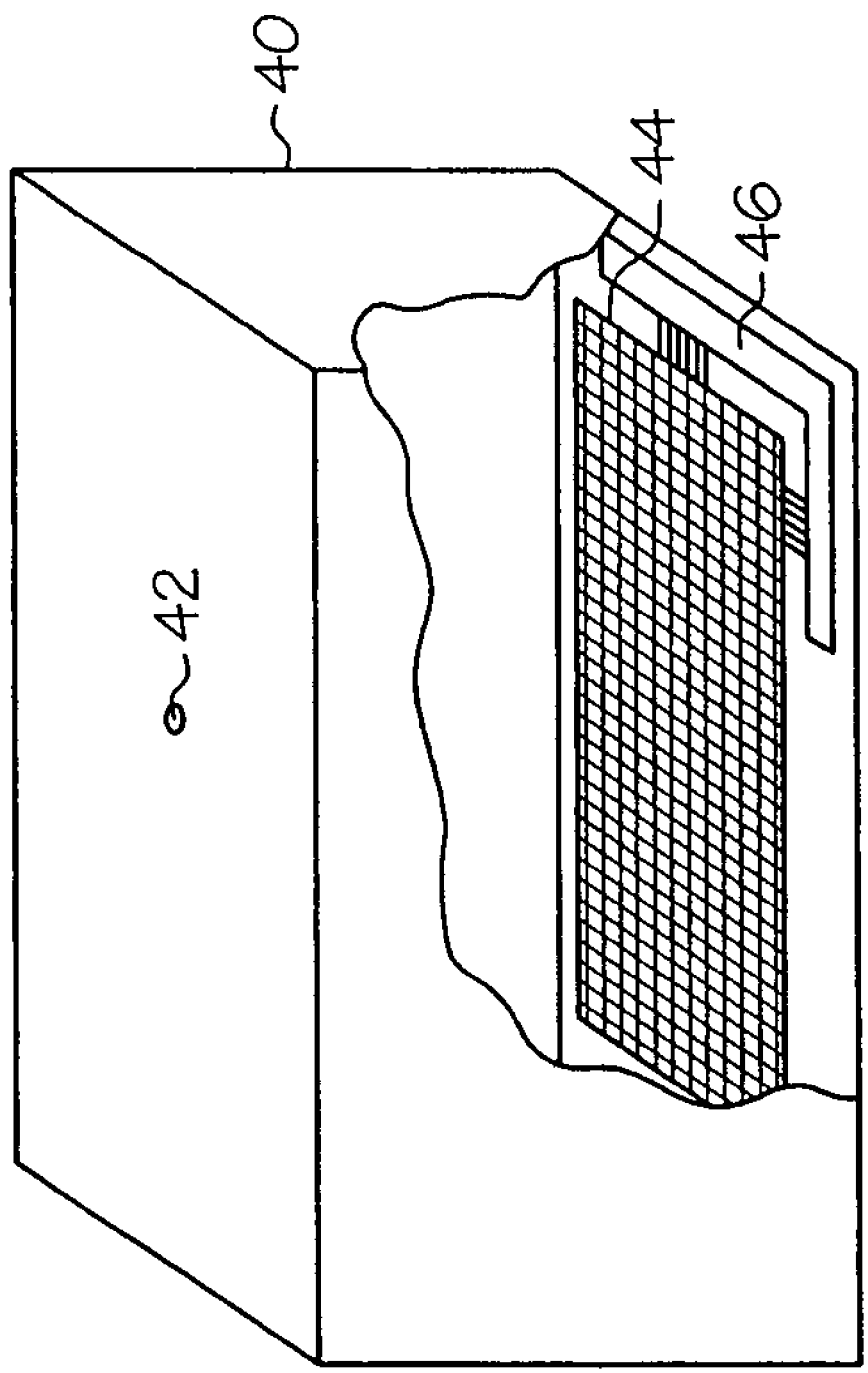
FIG. 6 is a perspective view of an apparatus for determining the orientation of a unit in accordance with a second embodiment of the present invention.

FIG. 6 is a perspective view of a second embodiment of the present invention that employs a two-dimensional array of diodes, for example a charge-coupled device (CCD) array of sensor pixels that sense light energy, or alternatively, for example, a bolometer array of sensor pixels that sense heat energy. The illustrated embodiment includes a housing 40 that encloses a CCD array 44 coupled to a controller 46. The controller preferably comprises a microcomputer, as described above. The housing 40 includes an optical translation unit, for example in the form of a pinhole 42 or lens, capable of focusing a beam of electromagnetic energy incident upon the housing 40 onto the array 44, such that the position of the energy source relative to the lens 42 is mapped onto the two dimensional array 44.

FIG. 7 is a perspective view of the apparatus of the second embodiment of the present invention mounted in a field-deployed unit 48. As the sun 32 progresses across the sky (i.e., as the earth rotates relative to the sun) with the passage of time, samples are taken by the CCD array 44 at predetermined time intervals, for example, at 15 minute intervals. For example, at the time of the first sample, the sun 32A emits a beam of electromagnetic energy 33A that is directed at a particular angle toward the pinhole 42 of the housing 40. This energy beam 33A is in turn directed by the pinhole 42 to a corresponding pixel, or a group of pixels 50 of the CCD array 44, where a primary amount of the energy is directed. The controller takes second and third samples of the CCD array 44 following a predetermined interval of time, such that at each sample, the sun has moved in the sky by a discernable amount to later positions 32B, 32C respectively. Therefore, the electromagnetic energy beams 33B, 33C emitted at these times are incident on the pinhole 42 of the housing 40 at angles that are slightly different of those of the original beam 33A. As a result, the beams are redirected by the pinhole to a different pixel or group of pixels of the array 44 than at the first sample time. In this manner, the movement of the sun 32 relative to the deployed unit 48 is mapped onto the pixels of the CCD array 40.

Figure 8:
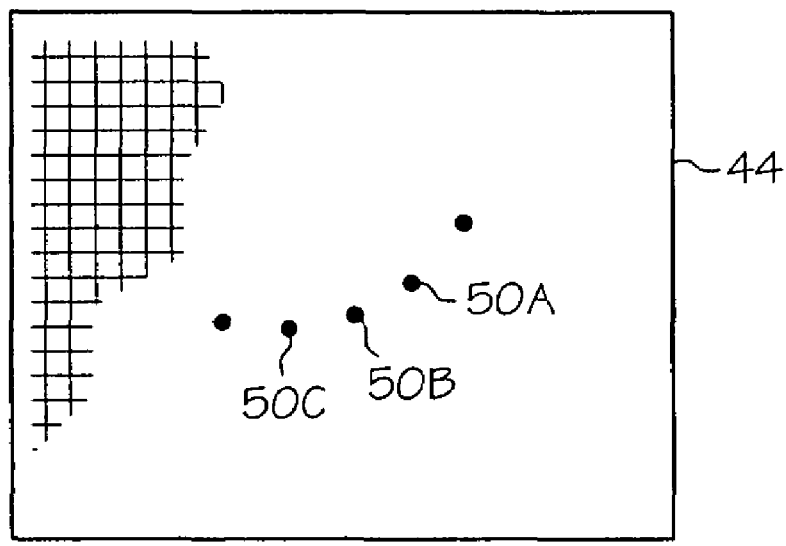
FIG. 8 is a top view of the CCD array of the embodiment of FIG. 7, in accordance with the present invention.

An example of such mapping is shown in FIG. 8, which is a top view of the CCD array 44 of the deployed unit 48 of FIG. 7. In this example, it can be seen that pixel 50A is stimulated during a first sampling, pixel 50B is stimulated during a second sampling, and pixel 50C is stimulated during a third sampling.

Figure 9:
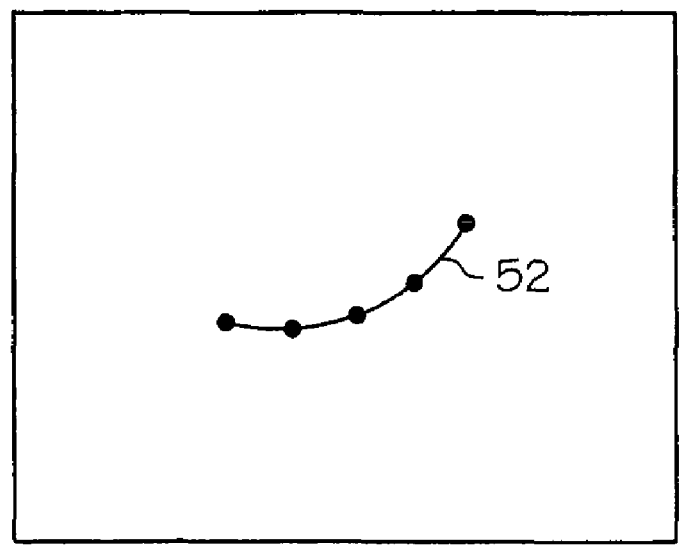
FIG. 9 is a chart illustrating a curve generated from the excited pixels of the CCD array of FIG. 8, in accordance with the present invention.

As shown in FIG. 9, the stimulated pixels of the CCD array 44 are tracked by the controller 46 and a curve 52 is approximated based on the stimulated pixels. Based on the approximated curve 52, an accurate accounting of the time of each sample, and the latitude, longitude, and altitude of the deployed unit 48, an accurate representation of the orientation of the deployed unit 48 can be determined.

An analogous situation is the movement of the sun and the sun's shadow produced by a sundial. The pinhole 42 operates as a lens, and the lens has a focal length. The CCD array 44 is positioned at the focal length of the pinhole 42. The image of the sun at each instant in time is focused on one or a few pixels. While the pixels could be digital (on-off), they could also be analog, or gray-scale. The path of the sun can be determined by the pixel reading and by the knowledge of the image-reversal (Fourier transform effect) of the lens. This measured path is correlated to the expected, known path and position information of the sun, as provided above. Other lenses, for example optical lenses formed of glass, plastic, sapphire, are equally applicable, assuming they are transparent at the desired frequency.

The CCD array embodiment further allows for the determination of orientation of a unit when the array device, for example the array device of FIG. 6, is tilted by an unknown magnitude and in an unknown direction. The solution is most readily understood by first considering the solution for the case where the array is mounted level with respect to the ground. Based on the GPS data, the current time and position of the host unit are known. From this information, the current azimuth and elevation of the sun are determined, as described above. This azimuth angle is determined, for example, relative to north, from data that may optionally be stored in a "look-up" table.

Figure 10:
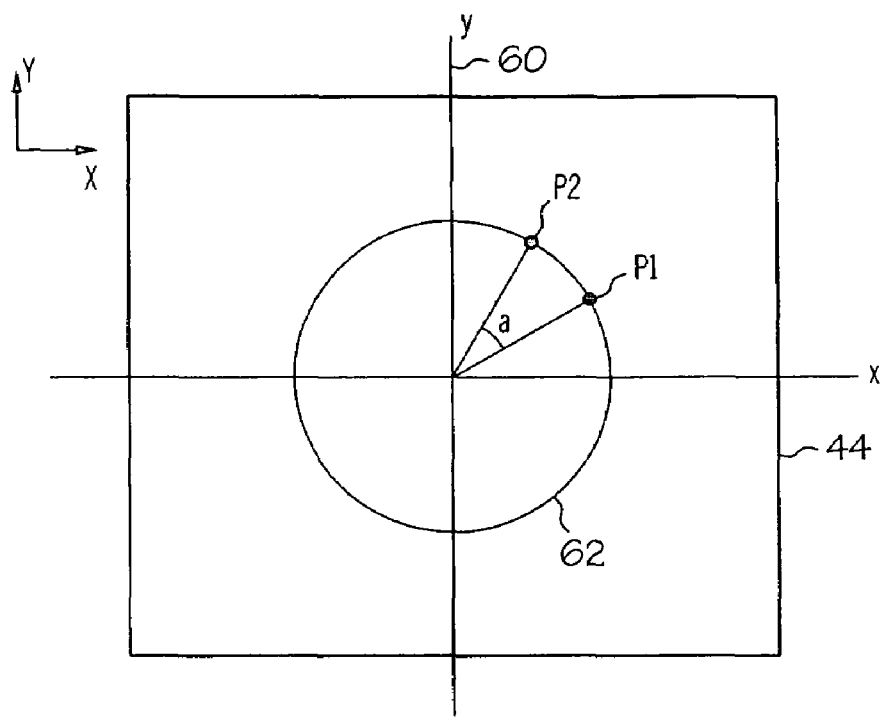
FIG. 10 is a top view of the projection of the position of the sun onto a two-dimensional array of sensors, assuming the sensor array to be mounted level with respect to the ground, in accordance with the present invention.

Referring to FIG. 10, assuming the Y-axis 60 of the array 44 to be aligned with the north, then the center of the solar image maps to point P1, referred to herein as "zero rotation position". However, assuming the Y-axis 60 is not aligned with the north, then the actual projection of the position of the sun on the array will lie along some point on a circle 62. Assuming the actual measured position to be at point P2 on the array, then the Y-axis of the CCD array is determined to be rotated with respect to north by the angle a. Hence, assuming the array to be installed in a level position, the orientation of the unit can be resolved with a single measurement.

Figure 11:
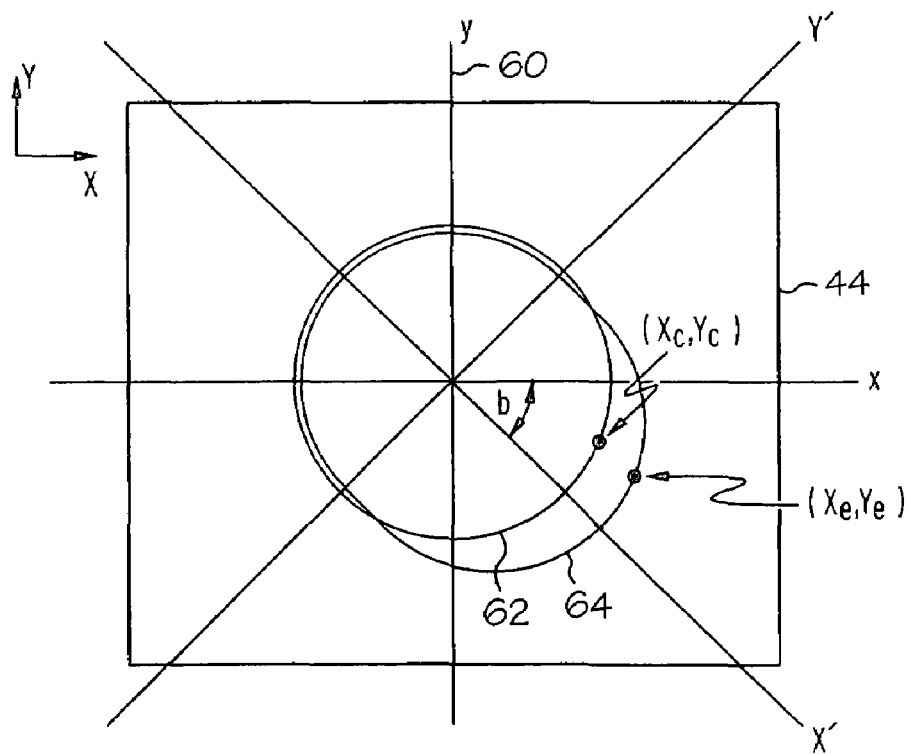
FIG. 11 is a top view of the projection of the position of the sun onto a tilted two-dimensional array of sensors, comparing the level-mounted array of FIG. 10 with a tilted array, in accordance with the present invention.

In a more general case, the CCD array 44 is assumed to be mounted at an angle relative to ground, in other words, the array is "tilted". In this example, the possible set of positions for the projection of the sun onto the array 44 lies along an ellipse 64 as shown in FIG. 11. The tilt and orientation of the array 44 in this example are defined by a rotation angle b, and a depression angle c that result in the projections lying along the ellipse 64. Assuming the x, y coordinate system to be oriented such that the Y-axis is aligned with north, then the x', y' coordinate system shown in FIG. 11 is rotated relative to the x, y coordinate system by an amount of rotation angle b. Assuming that the sun's position were to map to point $(x_c, y_c)$ for a level CCD array, then, assuming the array 44 to be tilted, the sun's position would map to a point along the ellipse 64, for example at point $(x_e, y_e)$. In this example, the subscripts "c" and "e" refer to "circle" and "ellipse".

Figure 12:
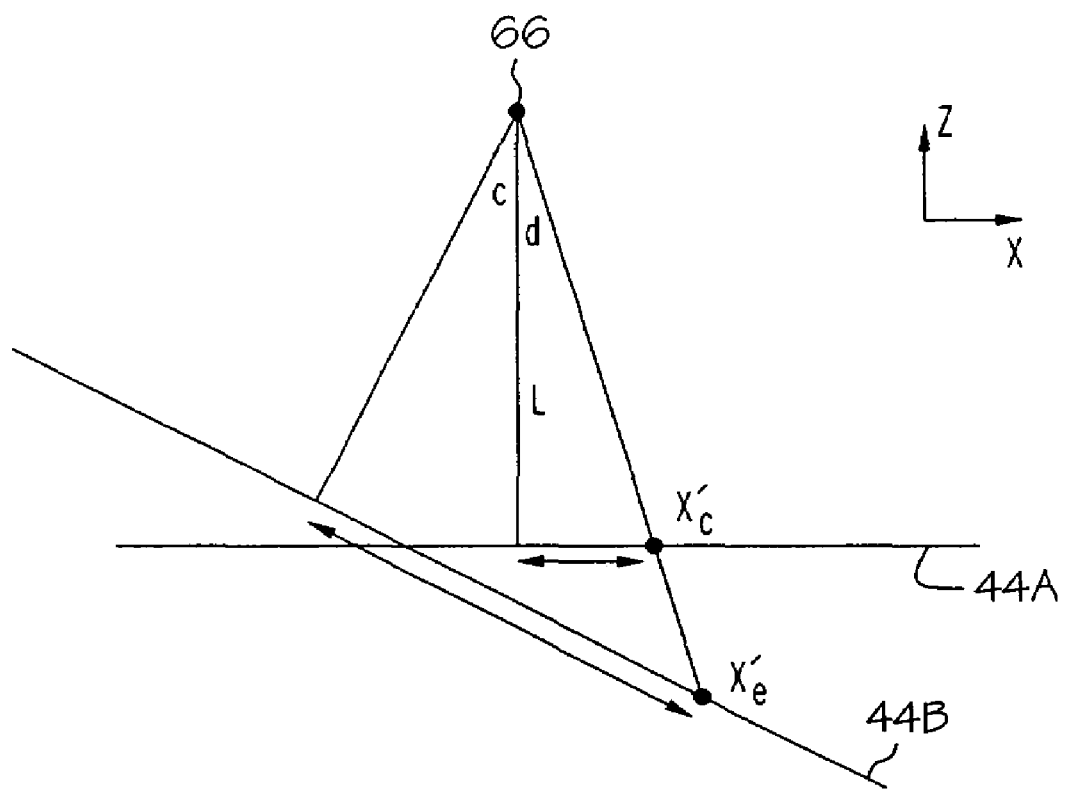
FIG. 12 is a side view of the projection of FIG. 11, in accordance with the present invention.

FIG. 12 is a side view of the mapping of the projected position from the circle to the ellipse in the x',y' coordinate system. The CCD array 44A, 44B is shown rotated about the system lens. The angle c represents the tilt depression angle of the tilted CCD array 44B, which is initially unknown. The angle d represents the elevation angle of the sun, which is known. The distance L represents the focal length of the system originating at a point of focus 66, which is also known.

Assuming the above:

$$x'_e = L_0 \tan(c+d) \quad (16)$$

$$x'_c = L_0 \tan(d)$$

$$x'_c = x'_e \tan(d)/\tan(c+d)$$

$$y'_c = y'_e$$

and:

$$x'_e = L \cdot \tan(c+d) \quad (17)$$

$$x'_c = L \cdot \tan(d)$$

$$x'_e = x'_c \cdot \tan(c+d)/\tan(d)$$

$$y'_e = y'_c$$

The transformation from the x,y coordinate system to the x',y' coordinate system is given by:

$$x' = x \cdot \cos(b) + y \cdot \sin(b) \quad (18)$$

$$y' = y \cdot \cos(b) - x \cdot \sin(b)$$

$$x_e' = x_e \cdot \cos(b) + y_e \cdot \sin(b) \quad (19)$$

$$y_e' = y_e \cdot \cos(b) - x_e \cdot \sin(b)$$

$$x'_c \cdot \tan(c+d)/\tan(d) = x_e \cdot \cos(b) + y_e \cdot \sin(b) \quad (20)$$

$$x'_c = \tan(d) \cdot (x_e \cdot \cos(b) + y_e \cdot \sin(b))/\tan(c+d)$$

$$y'_c = y_e \cdot \cos(b) - x_e \cdot \sin(b)$$

Finally, the rotation back to the x,y coordinate frame is given by $$X_c = x_c' \cdot \cos(b) - y_c' \cdot \sin(b) \quad (21)$$

$$Y_c = y_c' \cdot \cos(b) + x_c' \cdot \sin(b)$$

The angle "d" is the elevation angle of the sun, which is known.

$$\tan(c+d) = (\sin(c) \cdot \cos(d) + \cos(c) \cdot \sin(d))/(\cos(c) \cdot \cos(d) - \sin(c) \cdot \sin(d)) \quad (22)$$

assuming $c1 = \cos(c)$, then $$\sin(c) = (1-c1^2)^{1/2} \quad (23)$$

assuming $c2 = \cos(b)$, then $$\sin(b) = (1-c2^2)^{1/2} \quad (24)$$

Hence, the point $x_c$, $y_c$ can be computed from the measured coordinate $x_e$, $y_e$ by solving for the two unknown coefficients c1 and c2. With two position measurements, $x_{e1}$, $y_{e1}$ and $x_{e2}$, $y_{e2}$, the coefficients c1 and c2 can be uniquely solved since the positions $x_{c1}$, $y_{c1}$ and $x_{c2}$, $y_{c2}$ are known from known Solar azimuth and elevation data.

Since the relationships are nonlinear, an iterative search technique would need to be implemented, for example in the microcontroller, to solve for c1 and c2. After solving for c1 and c2 the "tilt" factor of the array is eliminated from the measurement and the orientation is resolved in the same manner as in the case of the level CCD array.

The sun's bearing is immediately known when it is on the horizon. For this reason, a single sample reading at these times will provide an accurate determination of orientation. At mid-day a two-dimensional track of the sun's path using the CCD array can help to improve the accuracy of the measurement. This is especially helpful at low latitudes, where at mid-day, the intensities of adjacent photodetectors would be nearly equal.

While this invention has been particularly shown and described with references to preferred embodiments thereof, it will be understood by those skilled in the art that various changes in form and details may be made herein without departing from the spirit and scope of the invention as defined by the appended claims.

For example, while the above example describes preferred sources of the electromagnetic energy as being heavenly bodies, for example, the sun, the moon, and stars, manmade sources of electromagnetic energy are consistent with the principles of the present invention, including satellites, laser energy (both space-based and earthbound), and the like, and are therefore equally applicable.

We claim:

1. A system for determining the orientation of an object relative to a source of electromagnetic radiation comprising:
   a two-dimensional array of sensors, each of the sensors producing a corresponding output signal when placed in the path of electromagnetic radiation emitted by the source;
   a radiation director that directs the electromagnetic radiation from the source onto the two-dimensional array of sensors; and
   a controller that receives the output signals of the sensors, and that determines the orientation of the object relative to the source based on the output signals of the sensors.

2. The system of claim 1 wherein the two-dimensional array of sensors comprises a charge-coupled device (CCD) array.

3. The system of claim 1 wherein the two-dimensional array of sensors comprises a bolometer array.

4. The system of claim 1 wherein the source of the electromagnetic radiation is the sun.

5. The system of claim 1 wherein the electromagnetic radiation is of a type selected from the group consisting of visible radiation, infrared radiation, and ultraviolet radiation.

6. The system of claim 1 wherein the sensors are optical sensors.

7. The system of claim 6 wherein the optical sensors comprise photodiodes.

8. The system of claim 7 wherein the output signals are derived from the intensity of light radiation received at the photodiodes.

9. The system of claim 1 wherein the output signals of the sensors are binary signals that indicate those sensor elements of the two-dimensional sensor array that are activated in response to receiving the electromagnetic energy at a level above a predetermined threshold.

10. The system of claim 9 wherein the controller determines the orientation of the object based on multiple samples of the output signals of the sensors taken at predetermined time intervals.

11. The system of claim 9 wherein the controller further:
    tracks elements of the sensor array that are activated at each sample interval;
    fits a polynomial to the activated sensor elements over time;
    determines the orientation of the object based on the polynomial.

12. The system of claim 1 wherein the controller determines the orientation of the object further based on a known factor of a type selected from the types consisting of: time, latitude, longitude, and altitude.

13. The system of claim 1 wherein the radiation director comprises a pinhole in a housing body containing the two-dimensional array of sensors.

14. The system of claim 1 wherein the radiation director comprises a lens attached to a housing body containing the two-dimensional array of sensors.

15. The system of claim 1 wherein the radiation director comprises an optical element attached to a housing body containing the two-dimensional array of sensors.

16. The system of claim 1 wherein the controller determines the orientation of the object further based on a theoretical determination of the electromagnetic radiation source position.

17. The system of claim 16 wherein the controller further determines the orientation of the object by comparing the theoretical determination of the electromagnetic radiation source position to an actual determination of the position based on the output signals of the sensors.

18. A system for determining the orientation of an object relative to a source of electromagnetic radiation comprising:
   a housing constructed and arranged to be positioned at a stationary, earth-based location;
   a two-dimensional array of sensors positioned in the housing, each of the sensors producing a corresponding output signal when placed in the path of electromagnetic radiation emitted by the source;
   a radiation director on the housing that directs the electromagnetic radiation from the source onto the two-dimensional array of sensors; and
   a controller that receives the output signals of the sensors, and that determines the orientation of the object including the housing relative to the source based on the output signals of the sensors.

19. The system of claim 18 wherein the two-dimensional array of sensors comprises a charge-coupled device (CCD) array.

20. The system of claim 19 wherein the two-dimensional array of sensors comprises a bolometer array.

21. The system of claim 18 wherein the radiation director comprises a pinhole in the housing.

22. The system of claim 18 wherein the radiation director comprises a lens.

23. The system of claim 18 wherein the radiation director comprises an optical element.

24. The system of claim 18 wherein the controller determines the orientation of the object further based on a theoretical determination of the electromagnetic radiation source position.

25. The system of claim 24 wherein the controller further determines the orientation of the object by comparing the theoretical determination of the electromagnetic radiation source position to an actual determination of the position based on the output signals of the sensors.

26. The system of claim 18 wherein the source of the electromagnetic radiation is the sun.

27. The system of claim 18 wherein the electromagnetic radiation is of a type selected from the group consisting of visible radiation, infrared radiation, and ultraviolet radiation.

28. The system of claim 18 wherein the sensors are optical sensors.

29. The system of claim 28 wherein the optical sensors comprise photodiodes.

30. The system of claim 29 wherein the output signals are derived from the intensity of light radiation received at the photodiodes.

31. The system of claim 18 wherein the output signals of the sensors are binary signals that indicate those sensor elements of the two-dimensional sensor array that are activated in response to receiving the electromagnetic energy at a level above a predetermined threshold.

32. The system of claim 31 wherein the controller determines the orientation of the object based on multiple samples of the output signals of the sensors taken at predetermined time intervals.

33. The system of claim 31 wherein the controller further:
   tracks elements of the sensor array that are activated at each sample interval;
   fits a polynomial to the activated sensor elements over time;
   determines the orientation of the object based on the polynomial.

34. The system of claim 18 wherein the controller determines the orientation of the object further based on a known factor of a type selected from the types consisting of: time, latitude, longitude, and altitude.

35. A method for determining the orientation of an object relative to a source of electromagnetic radiation comprising:
   positioning the object at a stationary, earth-based location;
   directing electromagnetic radiation emitted by the source through a radiation director onto a two-dimensional array of sensors contained in the object, each of the sensors producing a corresponding output signal when placed in the path of electromagnetic radiation emitted by the source;
   determining the orientation of the object relative to the source based on the sensor output signals.

36. The method of claim 35 wherein the two-dimensional array of sensors comprises one of a charge-coupled device (CCD) array and a bolometer array.

37. The method of claim 36 wherein the CCD array comprises a plurality of pixels, and wherein the movement of the orientation of the object relative to the source of electromagnetic radiation is mapped onto the pixels of the CCD array.

38. The method of claim 35 wherein the output signals of the sensors are binary signals that indicate those sensor elements of the two-dimensional sensor array that are activated in response to receiving the electromagnetic energy at a level above a predetermined threshold.

39. The method of claim 38 further comprising determining the orientation of the object based on multiple samples of the output signals of the sensors taken at predetermined time intervals.

40. The method of claim 39 further comprising:
   tracking elements of the sensor array that are activated at each sample interval;
   fitting a polynomial to the activated sensor elements over time;
   determining the orientation of the object based on the polynomial.

41. The method of claim 40 wherein the orientation of the object is determined based on a known factor of a type selected from the types consisting of: time, latitude, longitude, and altitude.

* * * * *